Sept. 12, 1933.                 H. H. CANNON                    1,926,226
                      METHOD OF SWEETENING A PETROLEUM
                         Original Filed July 8, 1929
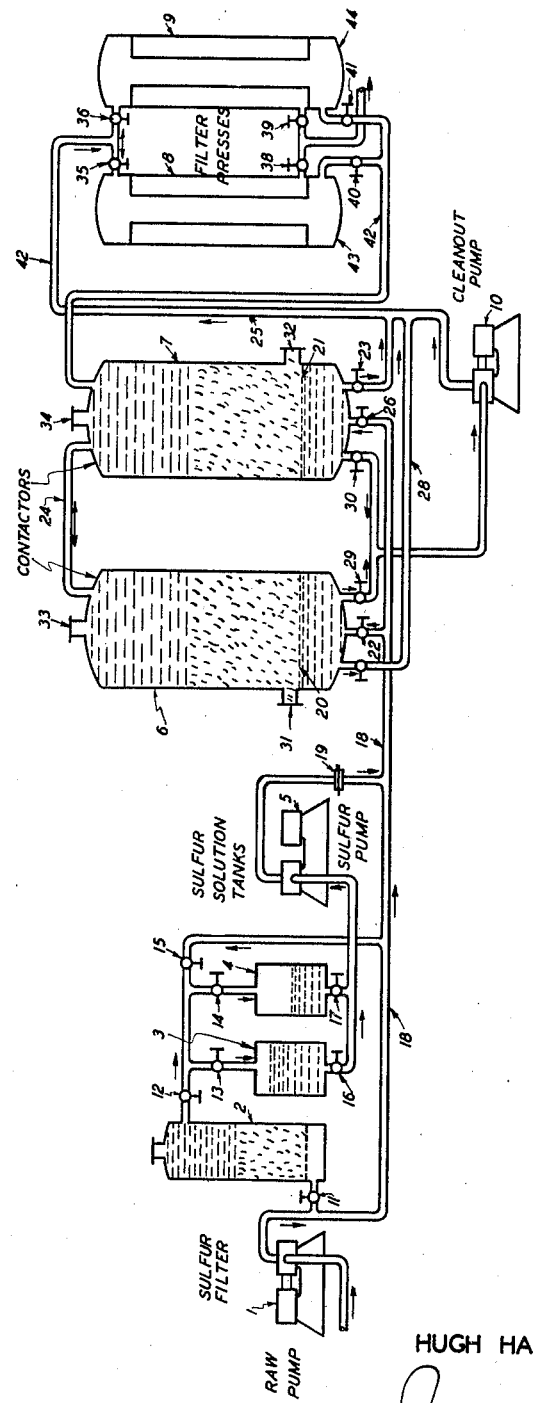
HUGH HARLEY CANNON
          INVENTOR
ATTORNEY Patented Sept. 12, 1933

1,926,226

UNITED STATES PATENT OFFICE 1,926,226

METHOD OF SWEETENING A PETROLEUM

Hugh Harley Cannon, Los Angeles, Calif., assignor to Cannon-Prutzman Treating Processes, Ltd., Los Angeles, Calif., a corporation of California Original application July 8, 1929, Serial No. 376,516. Divided and this application September 24, 1930. Serial No. 484,128

7 Claims. (Cl. 196—33)

This application is a division of my co-pending application entitled Process for sweetening gasoline, now Patent 1,798,784, granted March 31, 1931.

My invention relates to the so-called sweetening of gasoline containing sulfur in chemically active combination, the form of combination being supposedly that of the typical mercaptan or hydrosulfid of an alkyl radicle. The mercaptans are characterized by giving a black precipitate of lead sulfid when they are, or an oil containing them is, treated with a solution of litharge in caustic soda and thereafter with a very small quantity of elementary sulfur. The mercaptans when so treated are believed to form lead salts, lead mercaptids, which in turn are converted into hydrocarbons free from mercaptans by the precipitation of the lead as a sulfid.

The above is the process known to the trade as the "doctor treatment" and is now in general use. In its practice litharge is dissolved in a strong solution of caustic soda and the oil is agitated with the solution of "sodium plumbite" so produced. The solution is then settled out and parted and a sufficient quantity of sulfur to precipitate the lead is added, either as a fine powder or in solution. The precipitate of lead sulfid is finally settled out and parted from the oil.

While this process is, apparently for lack of a desirable substitute, in widespread use, its drawbacks are numerous and well known, being in part; high cost of the reagent; the causticity and corrisiveness of the reagent and its tendency to degenerate on standing; slow settling and incomplete parting; loss of oil by emulsification; contamination of the product with lead sulfid, which often refuses to settle, and difficulty in either disposing of the spent reagent or of separating and recovering its constituents.

In an improved process for which applications were filed by Hugh Harley Cannon and Wright W. Gary on January 21, 1929, Serial No. 334,003 entitled "Continuous method for sweetening petroleum" and Serial No. 334,004 entitled "Reagent for sweetening sulfurous petroleums", the sodium plumbite mixture above referred to was replaced by a mixture of an alkali earth hydroxid (such as calcium hydroxid) with litharge and diatomaceous earth, and this mixture, in the form of a substantially dry powder, was built into a cake in a filter press and the oil to be sweetened passed through such cake, with the continuous addition to the oil of the sulfur required to precipitate the lead.

This process proved to be much cheaper and more desirable than the previous sodium plumbite treatment, but in application on a large scale it developed certain defects which materially reduced its usefulness, these defects being, first, that the reagent disclosed in the second named application reacted so slowly with the sulfurous constituents of the oil that while the ultimate consumption of reagent was small a very large momentary proportion of reagent to oil was required, and second, that the filtration method proposed in the first named application either gave a very low flow rate or else required the use of an inordinately thick filter cake.

I have discovered that both of these defects may be remedied and the usefulness of the general method greatly increased by changes in both the reagent and the manner of applying it to the oil. The first named change consists in adding to the previous mixture a relatively minute quantity of an alkali metal hydroxid (preferably sodium hydroxid because of its low cost, but alternatively a hydroxid of potassium, lithium or one of the rarer alkali metals), by which addition the speed of the reaction is multiplied several times. The second named change consists in contacting the reagent powder with a retarded stream of the oil in agitating or percolation vessels in or in connection with which the powder is allowed to largely subside before the oil passes to the filter. By this change inexpensive vessels are substituted in part for more costly filters and the complexity and first cost of the apparatus is decreased.

In order to prepare my improved reagent I start with the following ingredients, in parts per hundred by weight, it being understood that these proportions are preferred proportions only and that the scope of my inventions is by no means limited thereto:

| | Parts |
|---|---|
| Sodium hydroxid (commercial caustic soda) | 3 |
| Calcium hydroxid (slaked lime) | 25 |
| Lead oxid (commercial litharge) | 16 |
| Diatomaceous earth (200 mesh powder) | 22 |
| Water | 34 |
| | 100 |

The proportion of water stated includes the water which may occur in the various other ingredients, which are taken on a dry basis.

I first dissolve the caustic soda in the water and then stir in the lime, which when thoroughly blended produces a thin cream. I then add the litharge to the mixture and stir again until smoothly blended, which produces a thick cream. This cream is mixed with the diatomaceous earth, the result being a somewhat damp and slightly coherent powder. It will be understood that this manner of mixing is a preference only, giving, in my experience, a somewhat more efficient product than can be had by mixing the ingredients in a different order, but good results may be obtained by mixing all the ingredients at once or in any order and I do not limit my invention to the manner of mixing above described.

The powder thus produced is used as a sweetening agent by contacting it for a sufficient time, say from three to seven minutes, with a sour oil in which a quantity of sulfur corresponding to the mercaptan sulfur is previously dissolved.

If a question of operating efficiency be disregarded this contact may be produced in any desired manner. For instance, a sufficient quantity of the powder may be agitated with a batch of oil and settled out, the mass of powder being so applied to successive batches until it is exhausted. Or it may be built up into a cake in a filter press and the oil passed through it until the flow rate consistent with the performance of the sweetening function becomes too low.

I prefer, however, to apply my novel reagent to the oil in an apparatus such as is illustrated in the accompanying drawing, Fig. 1, in which 1 is a pump which supplies the entire apparatus with sour oil, i. e., the oil to be sweetened; 2 is a sulfur tower for producing a dilute solution of sulfur in oil; 3 and 4 are sulfur solution tanks, one being in use while the other is being filled; 5 is a pump for delivering a measured proportion of sulfur solution into the stream of oil delivered by pump 1; 6 and 7 are contactors in which the reagent is placed and through which the oil is passed; 8 and 9 are filter presses by which small quantities of reagent carried forward from the contactors are removed from the sweet oil, and 10 is a pump used for cleaning the presses.

The sulfur tower 2 is charged with solid sulfur in lump or powdered form, and a small stream of oil is passed through it, bringing the sulfur into solution. This solution passes out through an open valve 12 and through one or the other of the valves 13 or 14 into the corresponding solution tank. It is desirable to keep this solution at some standard strength, say from 0.5% to 1.0% free sulfur, and this may be done by making the original solution over strength and diluting back with oil admitted by opening valve 15 and the desired tank valve, solution valve 12 then being closed.

The sulfur pump 5 draws standardized solution from one or the other of the tanks, valves 16 and 17 being used for this diversion. This solution is delivered into the main oil feed line 18 which leads from pump 1 to the contactors 6 and 7, in carefully measured proportion, as by means of the orifice suggested at 19. The most sensitive and positive control means for this proportioning is required in order to feed a sufficient quantity of sulfur to secure complete sweetening while avoiding any excess, which will produce a corrosive oil.

The contactors 6 and 7 are filled with powdered reagent to say one-half their total height, this bed of reagent resting on any suitable permeable member, such as a screen-supported cloth, indicated at 20 and 21. The stream of oil delivered by pump 1 and supplied with sulfur solution by pump 5 enters the bottom of one of these contactors, flows upward through the reagent bed, overflows to the other contactor, flows downward through the reagent bed and passes thence to a filter.

It is highly desirable that the first contactor in the direction of flow should be charged with the most nearly exhausted reagent and the second with a fresher reagent, in order that the reagent may be completely exhausted before it is withdrawn from the cycle without unduly prolonging contact time. I have therefore provided such pipe connections and valves that either contactor may become the first in the series while maintaining always an upward flow in the first contactor and a downward in the second.

For instance, by opening valves 22 and 23 the oil is caused to flow upward through contactor 6, through the cross-over pipe 24, downward through contactor 7 and thence through pipe 25 to the presses. Closing these valves and opening valves 26 and 27 the oil flows upward through contactor 7, through cross-over pipe 24, downward through contactor 6, and through pipes 28 and 25 to the presses.

In starting the apparatus both of the contactors are filled with fresh reagent. When the first in the series becomes exhausted it is emptied and refilled as follows:—stop pump 1, start pump 10, open valve 29 or 30 as the case may be, pump the liquid contents of the contactor through pipe 25 into a press, open lower manhole 31 or 32, withdraw the powdered contents of the contactor, recharge with reagent through upper manhole 33 or 34, and reverse the previous position of the flow valves 22—23 and 26—27.

The oil flowing through pipe 25 is diverted to one or the other of filters 8 and 9 by means of the inlet valves 35 and 36. The corresponding outlet valve 38 or 39 being opened the sweetened oil, free from the last traces of reagent, flows through pipe 37 to a suitable point of storage or disposal not shown. Because of the downward flow of oil through the second of the contactors only traces of reagent are carried to the filters and these will need to be cleaned only at considerable intervals.

When cleaning is required pump 1 may be shut down and pump 10 started, valve 30 opened and the stream of oil withdrawn from contactor 7 diverted into the filled filter by opening either valve 35 or 36. The corresponding bottom valve 40 or 41 is also opened and the contents of the filter thus flushed back into contactor 7 through pipe 42. If preferred the filter may be dumped in the usual manner by dropping the bottom head 43 or 44.

The described manner of operation is desirable and economical for several reasons, viz., the sulfur is in solution and may be exactly proportioned to the oil; the contactors hold a large amount of reagent and thus permit a high flow rate; the reagent may be completely exhausted before it is discarded, and the press capacity required is small. Using my improved reagent an oil even very rich in mercaptans may be completely and positively sweetened on a single passage through the apparatus, in a practically continuous operation, without risk of obtaining a corrosive oil by overfeeding sulfur, and with all the advantages which accrue from the use of an inexpensive dry reagent.

While I have described in much detail a specific embodiment of my invention as regards both the material and the manner in which I prefer to apply it to the oil, I do not limit myslf by the detail shown and described.

For sodium hydroxid I may substitute hydroxids of other alkali metals, as before stated, and for calcium hydroxid I may substitute the hydroxid of barium or of other alkali earth metals. These substitutions are less desirable, as involving added cost without a corresponding gain in efficiency, but they fall entirely within the scope of my invention and are direct equivalents of the materials disclosed.

Likewise, within the scope of the term "diatomaceous" earth I mean to include infusorial earth, kieselguhr, and also such clays, earths and silicates as have a high degree of porosity and are light in weight. The porous varieties of magnesium silicate, such as sepiolite, are well suited to the preparation of my improved reagent.

Likewise, while I have disclosed the addition of water to dampen the powder, and while the addition of such water is desirable in that it accelerates the reaction, the mixture of materials described may be partly or entirely deprived of water without destroying its value as a desulfurizing agent for mercaptan sulfur. The speed of reaction, however, is greatly reduced by thus dessicating the reagent.

Likewise, while I have disclosed such specific proportions of materials as have, in my experience, produced the best results, these proportions may be widely departed from without destroying the value of the material. The lead is the direct mercaptan-converting constituent, combining with the mercaptans to form lead mercaptids which are afterward split by the addition of free sulfur, and a material proportion of this ingredient must be present in order to make the reagent effective; the lime acts first to render the lead reactive with the mercaptans and further reacts with the lead sulfid which is precipitated from the lead mercaptid, combining with its sulfur and placing its lead in condition to combine with further quantities of mercaptans, for which reason the lime ingredient should be present in as large proportion as is consistent with the requirements for other constituents; the sodium hydroxid acts as an accelerator and as little as one percent of the weight of lime used gives a valuable addition to reaction speed while on the other hand it may be substituted in part for lime until the proportions are substantially one to one or until the pulverulent mass begins to cohere, or the alkali too strongly attacks a siliceous earth constituent, and finally, the diatomaceous or other earth acts merely to distend the material, increase its available surface and improve its filtering properties, so that this ingredient may be reduced almost or quite to the vanishing point, with an appreciable reduction but not a complete destruction of the desulfurizing value of the mixture.

In brief, my invention of material lies in the application of a caustic alkali as an accelerator to a reagent composed substantially of lead oxid and an alkaline earth hydroxid, with the optional addition of a porous earth as a bodying medium, and I claim as my invention all materials for sweetening oil composed of an alkali hydroxid, an alkali earth hydroxid and lead monoxid, in whatever proportion.

In the herein disclosed process for applying powdered sweetening reagents to oils the contactors are so connected by piping that the oil flows upward in the first and downward in the second. As the mass in the second contactor lies on a foraminous medium, necessarily, this second contactor may be used as a filter and the filters disclosed be dispensed with. I show them and their method of operation for the reason that the direction of flow in either contactor is optional with the operator; thus, the flow through the first may be downward and through the second upward, or the flow through both may be in the same direction, either downward or upward.

If the arrangement actually used is such that the flow through the second contactor is upward some powdered reagent is certain to be discharged with the oil stream, and in such case the filters or an equivalent device for removing the last trace of the reagent from the oil stream is essential. My invention of method does not lie in the particular arrangement of apparatus, but in the contacting of the oil stream with a large mass of the reagent retained within a percolating shell and in the contacting of such stream with two or more such masses of progressive freshness and activity.

I claim as my invention:

1. The method of sweetening a petroleum containing mercaptans and free sulfur which consists in passing a flow stream of said petroleum through a retained mass of a powdered solid reagent comprising litharge, a hydroxid of an alkali earth metal, a hydroxid of an alkali metal and a porous earth in intimate admixture.

2. The method of sweetening a petroleum containing mercaptans and free sulfur which consists in passing a flow stream of said petroleum through a retained mass of a powdered solid reagent comprising litharge, a hydroxid of an alkali earth metal, a hydroxid of an alkali metal and a porous earth in intimate admixture, the proportion of alkali metal hydroxid being materially less than the proportion of alkali earth metal hydroxid.

3. The method of sweetening a petroleum containing mercaptans and free sulfur which consists in passing a flow stream of said petroleum through a retained mass of a powdered solid reagent comprising litharge, calcium hydroxid, sodium hydroxid and diatomaceous earth in intimate admixture.

4. The method of sweetening a petroleum containing mercaptans and free sulfur which consists in passing a flow stream of said petroleum through a retained mass of a powdered solid reagent comprising litharge, calcium hydroxid, sodium hydroxid and diatomaceous earth in intimate admixture, the proportion of sodium hydroxid being materially less than the proportion of calcium hydroxid.

5. The method of sweetening a petroleum containing mercaptans and free sulfur which consists in passing a flow stream of said petroleum through a retained mass a powdered solid reagent comprising litharge, a hydroxid of an alkali earth metal, a hydroxid of an alkali metal, a porous earth and water in intimate admixture, the proportion of water being sufficient to dampen the powdered material but insufficient to render it impermeable to the flow of oil therethrough.

6. The method of sweetening a petroleum containing mercaptans and free sulfur which consists in passing a flow stream of said petroleum through a retained mass of a powdered solid reagent comprising litharge, calcium hydroxid, sodium hydroxid, diatomaceous earth and water in intimate admixture, the proportion of water being sufficient to dampen the powdered material but insufficient to render it impermeable to the flow of oil therethrough.

7. The method of sweetening a petroleum containing mercaptans, comprising the following steps in combination; establishing a flow stream of the oil to be sweetened; continuously feeding into said stream a predetermined proportion of sulfur; contacting said stream with a mass of a powdered solid reagent comprising litharge, a hydroxid of an alkali earth metal, a hydroxid of an alkali metal and a porous earth by percolation of said stream through said mass; substantially separating said reagent from said mass and filtering any remaining reagent from said stream.

HUGH HARLEY CANNON.